H. COTTRELL.
Tools for Cutting Stone.

No. 156,914.  Patented Nov. 17, 1874.

Witnesses:
John Buckley
D. P. Cowl

Inventor:
Herbert Cottrell
by atty Hollok

UNITED STATES PATENT OFFICE.

HERBERT COTTRELL, OF NEWARK, NEW JERSEY, ASSIGNOR TO COTTRELL STONE MACHINERY COMPANY, OF NEW YORK, N. Y.

IMPROVEMENT IN TOOLS FOR CUTTING STONE.

Specification forming part of Letters Patent No. 156,914, dated November 17, 1874; application filed July 25, 1873.

*To all whom it may concern:*

Be it known that I, HERBERT COTTRELL, of Newark, Essex county, New Jersey, have invented certain new and useful Improvements in Tools for Cutting Stone, of which the following is a specification:

This invention relates to a molding-cutter, or a cutting-tool, adapted to form molded edges on stone.

The tool in which my invention consists comprises a chuck constructed to receive the removable sections, and a hub, screw-threaded or otherwise formed, to receive and engage the chuck, and to hold the cutting-sections down in place. The cutter-sections—as many in number as desired—project radially from the chuck, and have their exterior edges of the shape intended for the molding. These edges are armed with diamonds or carbons, so placed that the whole number of carbons in all the sections will cover or fill out the line of molding desired. Suppose, for instance, there are three cutter flanges or sections—the diamonds in the one are placed so as to be opposite the spaces between the diamonds in the others, so that each cutter will do one-third of the work. The cutting-sections fit in radial slots in the chuck, and down onto a rib or tenon (preferably wedge-shaped or beveled) in the bottom of the same, which holds their lower ends in place. The hub is provided with a like annular beveled projection or rib, which when the hub and chuck are screwed together, fits down in a correspondingly-shaped annular mortise in the top of the chuck, and into slots in the top of the center sections coinciding or in line with said mortise. The sections are thus drawn and held firmly in place.

It will of course be understood that the position of these tenons and slots or mortises may be reversed without any departure from my invention.

The nature of my improvement, and the manner in which the same is or may be carried into effect will be readily understood by reference to the accompanying drawing, in which—

Figure 1:
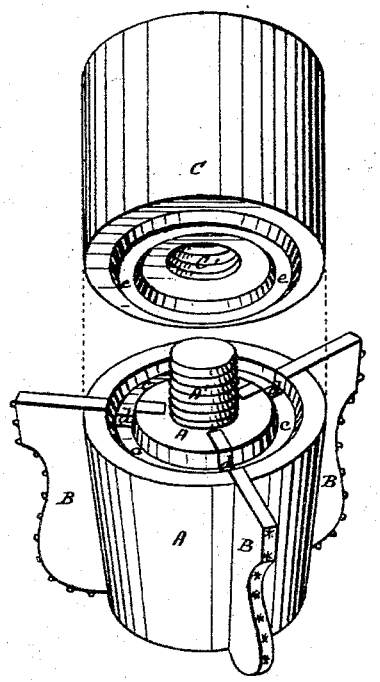
Figure 2:
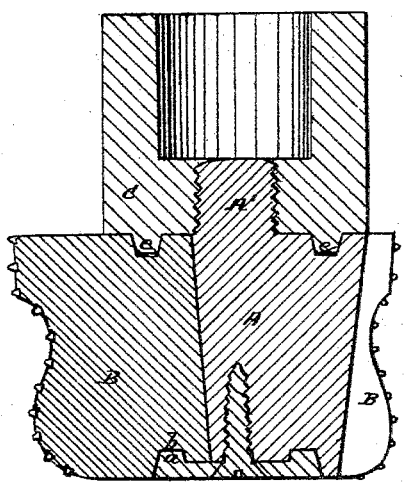

Figure 1 is a perspective view of a molding-cutter made in accordance with my invention, the hub and chuck being represented detached from one another. Fig. 2 is a vertical central section of the tool, with the hub and chuck united.

The chuck A is metal, and of any suitable diameter. In it are formed radial slots in number corresponding to the number of cutting-sections to be employed, and of dimensions to properly receive and support said sections. Each section B is received in its own slot, being readily fitted in and removed therefrom. In order to hold the lower ends of the sections in place, I form on the bottom of each slot an upwardly-projecting rib or tenon, $a$, preferably beveled or wedge-shaped, and in the lower end of each section is a mortise, $b$, of corresponding shape and size, so located that it will meet the tenon when the cutting-section is forced down in its slot. The engagement of the mortise and tenon serves to draw the lower end of the section closely down into place, and to prevent it from moving either out or in. In the upper end of the chuck is an annular recess, $e$, the sides of which are preferably beveled, as shown, and the upper ends of the sections B are recessed or mortised in corresponding form, the said mortises $d$ being so located and shaped that when the cutting sections are inserted in place in the chuck there will be a continuous annular recess in the top of the chuck. The chuck is provided with a central screw-threaded stem, $A'$, designed to screw into a central screw-threaded socket, $C'$, in the hub C, which hub, on its face contiguous to the upper end of the chuck, is provided with an annular beveled rib or projection, $e$, which, when the hub and chuck are screwed together, will enter the annular recess in the top of the chuck, and thus bind the sections in place.

It is manifest that the tenons $a$ may be formed on the cutting-sections, and the mortises $b$ in the chuck, and that a corresponding reversal of parts on the upper end of the chuck and contiguous face of the hub may be made without change in the character of the tool; and also, that means other than the screw-threaded stem A' and socket C' may be employed to draw and hold the chuck and hub together.

The hub is designed to be driven or fastened in the usual way on a mandrel which is revolved at high speed.

Any suitable number of cutting-sections may be employed. Three are shown in the drawing. Their outer edges, which are all of a corresponding pattern—according to the shape desired for the molding—are armed with carbons or diamonds. The aggregate number of diamonds on the sections is such that if the said diamonds were all collected on the molded edge of one of the sections, they would completely fill that edge from top to bottom; and they are so distributed on the several sections, that those on the one section will be opposite the intervals between those on the other sections, thus causing each section to do one-third of the work, and to cut its own particular portion of the molding.

The sections are, as above stated, detachable, and any number of interchangeable sets of sections of different patterns may be provided, thus permitting an unlimited variety of designs to be produced by a single tool.

Having described my invention, what I claim, and desire to secure by Letters Patent, is—

The combination, with the radially-slotted chuck and detachable molding cutter-sections, armed on their outer edges with diamonds or carbons, of the hub or cap for supporting the chuck and holding in place the cutting-sections, said sections being drawn and held tightly in position in the chuck by beveled ribs or tenons and mortises, formed, respectively, in said hub and chuck and sections, and adapted to engage one another, substantially in the manner shown and set forth.

In testimony whereof I have signed my name in the presence of two subscribing witnesses.

HERBERT COTTRELL.

Witnesses:
  JOHN BULKLEY,
  IRA M. TAYLOR.